United States Patent
Li et al.

(10) Patent No.: US 8,902,127 B2
(45) Date of Patent: Dec. 2, 2014

(54) METHOD FOR POWER SHARING AND CONTROLLING THE STATUS OF A DISPLAY WALL

(75) Inventors: Zhen Min Li, Beijing (CN); Ben Liang Li, Beijing (CN); Le Xiao, Beijing (CN); Paul Ryckaert, Oostduinkerke (BE); Chang Bin Jiang, Beijing (CN)

(73) Assignees: Barcon N.V., Kortrijk (BE); Barco Visual Electronics Co., Ltd., Beijing (CN)

( * ) Notice: Subject to any disclaimer, the term of this patent is extended or adjusted under 35 U.S.C. 154(b) by 1331 days.

(21) Appl. No.: 12/213,041

(22) Filed: Jun. 13, 2008

(65) Prior Publication Data

US 2009/0312884 A1    Dec. 17, 2009

(51) Int. Cl.
- *G09G 5/00* (2006.01)
- *G06F 3/14* (2006.01)
- *G09F 9/33* (2006.01)
- *G09G 3/32* (2006.01)

(52) U.S. Cl.
CPC .......... *G06F 3/1446* (2013.01); *G09G 2330/08* (2013.01); *G09G 2330/02* (2013.01); *G09G 2330/12* (2013.01); *G09G 3/32* (2013.01); *G09F 9/33* (2013.01)
USPC .............................. 345/1.3; 345/1.1; 700/295

(58) Field of Classification Search
USPC ................... 345/1.1–1.3, 2.1–2.3, 82–83, 55; 700/295
See application file for complete search history.

(56) References Cited

U.S. PATENT DOCUMENTS

| | | | | |
|---|---|---|---|---|
| 5,796,376 A | * | 8/1998 | Banks | 345/82 |
| 5,805,117 A | * | 9/1998 | Mazurek et al. | 345/1.3 |
| 5,867,236 A | * | 2/1999 | Babuka et al. | 349/73 |
| 6,153,946 A | * | 11/2000 | Koch et al. | 307/64 |
| 6,657,605 B1 | * | 12/2003 | Boldt et al. | 345/83 |
| 6,661,119 B2 | * | 12/2003 | Liu et al. | 307/71 |
| 6,754,835 B2 | * | 6/2004 | Bandholz et al. | 713/300 |
| 7,502,950 B1 | * | 3/2009 | Brands | 713/300 |
| 7,514,816 B2 | * | 4/2009 | Bemat et al. | 307/64 |
| 7,592,970 B2 | * | 9/2009 | Matthies et al. | 345/1.3 |
| 2004/0151304 A1 | * | 8/2004 | George et al. | 379/413 |
| 2005/0067902 A1 | * | 3/2005 | Bemat et al. | 307/140 |
| 2005/0134525 A1 | * | 6/2005 | Tanghe et al. | 345/1.1 |
| 2005/0172157 A1 | * | 8/2005 | Artman et al. | 713/300 |
| 2005/0253777 A1 | * | 11/2005 | Zehner et al. | 345/1.3 |
| 2005/0272402 A1 | * | 12/2005 | Ferentz et al. | 455/402 |
| 2006/0082222 A1 | * | 4/2006 | Pincu et al. | 307/29 |
| 2007/0000849 A1 | * | 1/2007 | Lutz et al. | 211/26 |
| 2007/0008259 A1 | * | 1/2007 | Barker | 345/84 |
| 2008/0174515 A1 | * | 7/2008 | Matthies et al. | 345/1.3 |
| 2009/0024929 A1 | * | 1/2009 | Gloege et al. | 715/740 |

* cited by examiner

*Primary Examiner* — Jason Mandeville
(74) *Attorney, Agent, or Firm* — Bacon & Thomas, PLLC

(57) ABSTRACT

Described is a method for power sharing of a display wall, in particular of a LED display wall having a plurality of display modules, and a plurality of N power supply units, each for driving a number of display modules, whereby during a failure of a first power supply unit of the plurality of N power supply units, the outputs of other power supply units are linked together such that the module or modules driven by the first and failed power supply continue(s) to operate, by redistribution of power from the other power supply units. Power sharing is also described in the context of a method for controlling the status of a display wall, in particular of a LED display wall, controlled by a central unit. The method includes collecting status and/or diagnostic information of the display wall inputted to the central unit; converting the status and/or diagnostic information to a picture; and displaying the picture on the display wall.

18 Claims, 3 Drawing Sheets

METHOD FOR POWER SHARING AND CONTROLLING THE STATUS OF A DISPLAY WALL

FIELD OF THE INVENTION

The invention relates to the field of power sharing and/or controlling the status of a display wall, in particular of a LED display wall, which is controlled by a central unit.

TECHNICAL BACKGROUND

Display walls are used in different application areas, such as indoor and outdoor advertising, for events such as concerts, sport games or general entertainment. Display walls are available in different sizes up to ten or more square meters. Different content, such as video, text or graphics can be shown on display walls, both as static or moving information.

Display walls are often made up of light emitting devices (LED) whereby these LED walls are often made up of multiple tiles and modules. Each tile may break up into 64 discrete modules, whereby each module may break up into 8 by 11 pixels that are represented each by one LED. These modules can be connected to a central unit inside the tile structure, by means of cables, each providing power and signalling to a number of modules, e.g. one cable for 16 modules.

Tiles known in prior art are a couple of meters in size, e.g. 9 by 7 meters, and may provide frames wherein the modules can be installed and removed, even without tools. For example, a module can slide into its place and is held firmly in place with integrated snap locks. Power supply and signalling is handled by a connector, whereby devices, such as the power supply unit, fans and controller boards, are typically positioned behind the modules.

Conventionally, there is a single power supply unit for a certain number of LED modules in a LED display wall, and in one display, there are tens of independent power supply units. The disadvantage of this topology is if one power supply unit fails, all the LED modules powered by this unit will go to black, therefore a 'black hole' will be generated.

In prior art arrangements it is difficult to locate damaged modules and/or devices. Especially on big display walls it is difficult and time-consuming to determine the exact location of a broken module or device within the display wall.

SUMMARY OF THE INVENTION

An object of the present invention is to provide additional operational security when there is a power failure of a power unit in display wall, in particular of a LED display wall.

The present invention provides a display wall comprising:
a plurality of display modules,
a plurality of N power supply units, each for driving a number of display modules,
further comprising means that during a failure of a first power supply unit of the plurality of N power supply units, links the outputs of other power supply units together such that the module or modules driven by the first and failed power supply continue(s) to operate, by redistribution of power from the other power supply units.

According to a embodiment of the invention, during a failure of a power supply the outputs of other power supplies are linked together such that the tile and/or module of the respective failed power supply continues to operate, e.g. to display an image or picture, even if the display is less intensive for example. This means that for the respective tile and/or module status and/or diagnostic information is still visible even when the respective power supply of that time is not working anymore due to the failure. This means also that due to the redistribution of power along some tiles and/or modules, the maximum brightness of the display may decrease by about $(N-1)/N$ of the maximum brightness, whereby N represents the number of power supplies linked together and there is a single failure.

Preferably, the display wall has tiles and each tile has a first and a second power supply unit, and a tile power distribution unit and a tile controller, the first power supply unit driving first modules and the second power supply unit driving second modules whereby when one of the first and second power supply units fail, the other of the first and second power supply unit is coupled to drive the first and second modules.

The display wall may have a central controller, wherein the display wall has tiles and each tile has a tile controller adapted so that an operation mode is entered such that the outputs of other power supply units are linked together such that the module or modules driven by the first and failed power supply continue(s) to operate by redistribution of power from the other power supply units, without activation of the central controller instructs.

Also, the display wall may have a central controller adapted such that if an operation mode is entered such that the outputs of other power supply units are linked together such that the module or modules driven by the first and failed power supply continue(s) to operate by redistribution of power from the other power supply units, the central controller instructs all power supply units of to reduce brightness in the same proportion so that the image displayed by the wall remains uniform.

The present invention also provides a method of driving a display wall having a plurality of display modules,
a plurality of N power supply units, each for driving a number of display modules, the method comprises:
during a failure of a first power supply unit of the plurality of N power supply units, linking the outputs of other power supply units together such that the module or modules driven by the first and failed power supply continue(s) to operate, by redistribution of power from the other power supply units.

The maximum brightness of the module or modules normally driven by the first power supply unit may decrease by $(N-1)/N$ of the maximum brightness.

Preferably, the display wall has tiles and each tile has a first and a second power supply unit, and the method may comprise:
driving first modules and driving second modules whereby when one of the first and second power supply units fail, the other of the first and second power supply unit is coupled to drive the first and second modules.

Optionally, if an operation mode is entered such that the outputs of other power supply units are linked together such that the module or modules driven by the first and failed power supply continue(s) to operate by redistribution of power from the other power supply units, all power supply units reduce brightness in the same proportion so that the image displayed by the wall remains uniform.

It is an alternative or additional object of the invention to provide a method which allows for easy topographical identification of broken components of a display wall.

This object is achieved by a method for controlling the status of a display wall, in particular of a LED display wall, controlled by a central unit, the method comprising collecting status and/or diagnostic information of the display wall inputted to the central unit, converting the status and/or diagnostic information to a picture and displaying the picture on the display wall. Power sharing can be useful to allow display of tiles which have gone black because of a power supply unit failure.

With such an arrangement it is possible to visualize status and/or diagnostic information of a display wall on the display wall itself. The visualization of the status and/or diagnostic information as a picture can be very helpful to check the readiness of a display wall or to determine faults. Status and/or diagnostic information may contain information about the status, in particular the health, of the display wall and/or its components, such as LEDs, power supplies or fans, or correspondent diagnostic information about the display wall and/or its components.

According to a preferred embodiment of the invention, the size of the picture corresponds to the size of the display wall. While the size of the picture can be e.g. half or quarter of the size of the display wall, it is especially preferred that the size of the picture matches exactly with the size of the display wall. Accordingly, the invention provides for the possibility to display status and/or diagnostic information in its topological correct position within the picture relative to where the status and/or diagnostic information originate from on the display wall.

In general, the picture can be displayed as stated above. However, according to a preferred embodiment of the invention, the picture is displayed as an on-screen display. This way, the picture displaying the status and/or diagnostic information can be superimposed on the display wall, which e.g. shows a video transmission or an advertisement.

Further, and according to another preferred embodiment of the invention, the picture and the display wall are separated in at least one, preferably multiple tiles, wherein the status and/or diagnostic information of each tile of the display wall is shown in its respective position in the picture. This means, that the build-up of the display wall that is made up by multiple tiles, is represented within the picture in its topological correct position, whereby the picture can be made up by tiles as well. This kind of separation of the picture allows for an easy location of faulty tiles of the display wall being displayed in the picture at the correct position.

It is further preferred that a tile comprises multiple modules and wherein status and/or diagnostic information of each module of the display wall is shown in its respective position in the picture. Given that the status and/or diagnostic information of the module is displayed in its respective and topographically correct position within the picture, it becomes simple for a technician to locate the correct module that must be replaced due to a failure or malfunction.

According to another preferred embodiment of the invention, each tile comprises a tile controller, wherein the tile controller collects the status and/or diagnostic information of all modules of the respective tile and wherein the tile controller sends status and/or diagnostic information to the central unit. Tiles and modules can be organised in a network with individual network addresses, as well as tile controllers and the central unit. Thus the tile controller can collect all status and/or diagnostic information and sends it to the central unit using a network protocol and/or using network communication systems, such as a wired or a wireless network. A tile controller and/or the central unit may comprise microprocessors or field programmable gate arrays that are programmable for the desired operations and can emit a failure signal in case an error is detected.

In a further preferred embodiment of the invention, the status and/or diagnostic information relates to the devices of the display wall. The display wall may comprise devices such as, and partially mentioned before and not limited to, modules, tiles, LEDs, power supplies, fans or controllers respectively controller boards, whereby all devices may comprise network addresses as well. Status and/or diagnostic information of these devices may comprise e.g. fan speed, open circuits on the LEDs or power supply actuals.

According to a preferred embodiment of the invention, the picture shows at least one, preferably multiple devices of the display wall, wherein each device of the display wall is shown in its respective position in the picture. In other words, the picture may show all devices, as outlined before, that the display wall is made up from, in its topographically correct position, given that the picture and the display matches exactly in size.

Generally, the picture may show only devices visible from the front of the display wall. According to a preferred embodiment of the invention, the picture shows devices, which are not visible from the front side of the display wall. This way, an onsite support engineer may easily locate the position of faulty device, which is not visible from the front side of the display wall.

According to another preferred embodiment of the invention the status and/or diagnostic information of a respective device is shown on the display wall in a different manner during a failure of the respective device. Faulty devices can e.g. be shown in a different colour, such as red, or in a blinking manner on the display.

According to a further embodiment of the invention, during a failure of a power supply the outputs of other power supplies are linked together such that the tile and/or module of the respective failed power supply continues to display the picture. This means that for the respective tile and/or module status and/or diagnostic information is still visible even when the respective power supply is not working anymore due to the failure. This means also that due to the redistribution of power along some tiles and/or modules, the maximum brightness of the display may decrease by about $(N-1)/N$ of the maximum brightness, whereby N represents the number of power supplies linked together. In a further embodiment of the invention redundant power supplies may be used to avoid power supply failures.

The invention further comprises an embodiment wherein the display wall is operated in a normal mode and/or in a controlling mode. During normal mode the display wall is usable for its original purpose such as video transmission or advertisement. The controlling mode is usable to check the status and/or diagnostic information of the display wall, e.g. after building up the display wall at a target location, prior to operations or in case of a failure.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
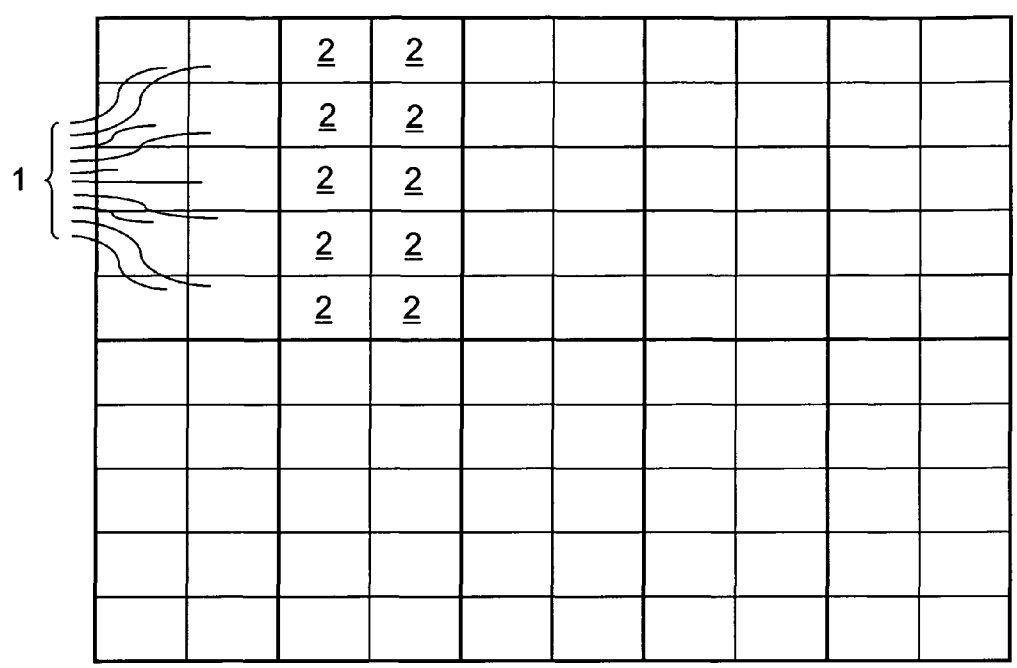
FIG. 1 depicts a graphical on-screen display arrangement for a display wall according to a preferred embodiment of the invention in a first view and FIG. 2 depicts the graphical on-screen display arrangement for the display wall according to a preferred embodiment of the invention in a second view.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" 5 means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics lo may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 2:
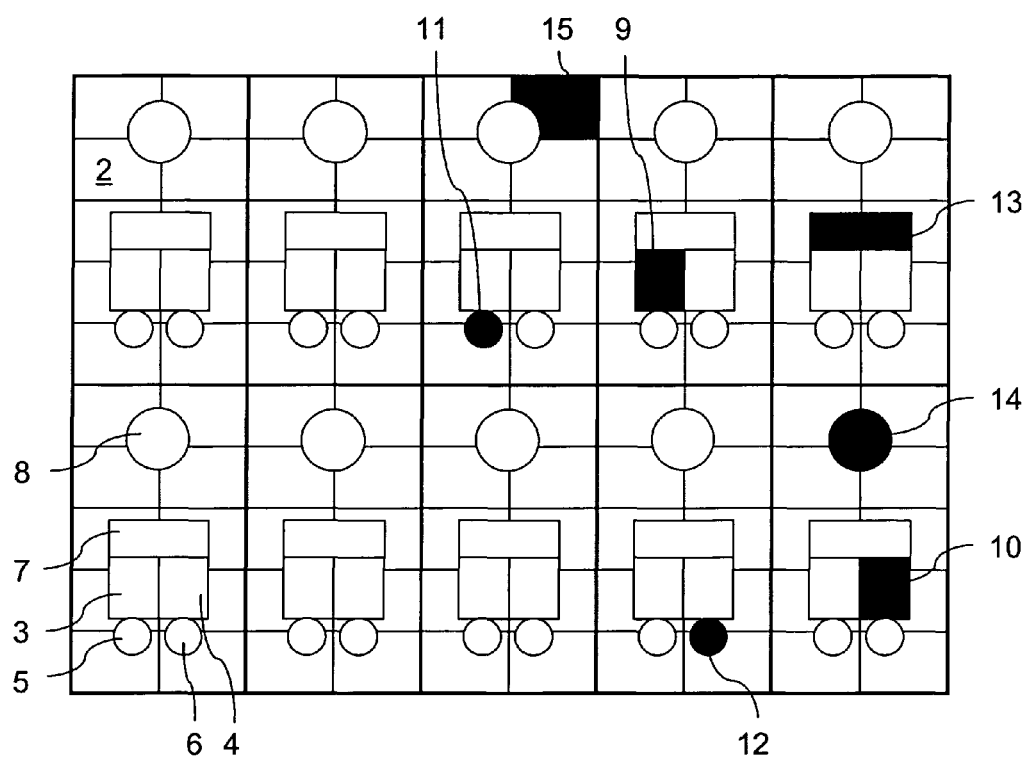
Figure 3:
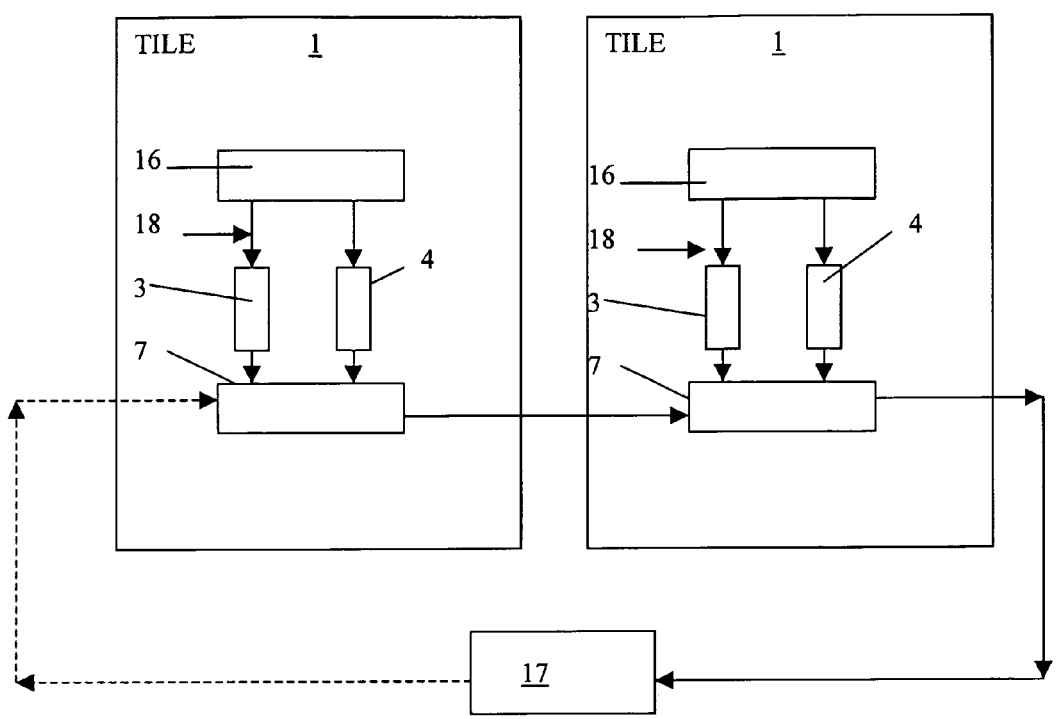
FIG. 3 depicts tiles of a display wall according to a preferred embodiment of the invention.

From FIGS. 1 to 3 an arrangement for power sharing among tiles is shown. As an example, each tile has 10 modules and each module has 16 by 24 pixels. As a specific advantageous use of power sharing the present invention is exemplified for a graphical on-screen display for a display wall according to a preferred embodiment of the invention. The graphical on-screen display according to the first view of the invention comprises multiple tiles 1. Each tile 1 comprises multiple modules 2. As depicted in FIG. 1, the on-screen display comprises in the present embodiment ten tiles, whereby each tile comprises ten modules.

As can be seen from FIGS. 2 and 3, the on-screen display shows multiple devices of the tiles. Each tile 1 comprises a first power supply 3 and a second power supply 4. The first power supply 3 and second power supply 4 provide power to a variety of electric and electronic components, e.g. fans, displays, light emitting devices, display modules, interfaces, network cards, microprocessors, microcontrollers etc. For example, the first power supply 3 drives a first fan 5 as well as the second power supply 4 driving a second fan 6. The tile further comprises a power distribution board 16 attached to the tile 1, to the first power supply 3, to the second power supply 4 and any devices that have to be driven such as fans, display modules etc. The tile further comprises a tile controller 7 that is attached to the tile 1, to the first power supply 3, to the second power supply 4 and to a tile fan 8.

As long as a power signal 18 is being sent by a power supply unit, then each power supply unit 3, 4 drives a certain number of tile modules, a fan etc. During situations when no faults are detected, the on-screen display simply shows a picture that topographically reproduces the devices of the display wall, even as they are invisible from the front, e.g. fans, power supplies.

In case a fault occurs in a power supply unit, then a power signal 18 is not present, e.g. supplied from power supply unit 3 in FIG. 3, and the controller 7 of the relevant tile will detect the fault. At least two power supply units 3, 4 are connected to each controller 7 so that even if one power supply unit is defective the controller can still function normally. Once a power supply unit fault is detected, the power distribution board 16 will then be instructed to switch the power from power supply unit 4 so that it drives the relevant display modules and other devices such as fans for power supply unit 3 as well as its own such devices. This does not require an interference by then central controller 17—it can be performed locally to controller 7.

In accordance with an embodiment of the present invention the power supply units 3, 4 are not over-dimensioned for redundancy so that when driving more modules from one power supply unit, the intensity of the modules will decrease.

In a further embodiment the controller 7 of one tile will inform the controller 7 of another tile and the power supply units of the other tile will also be switched in to assist into power the modules normally driven by the faulty power supply unit. If N power supply units can be ganged together when one supply fails then the brightness of the modules driven by these N−1 working power supply units will be (N−1)/N times as bright.

In accordance with another embodiment when one controller 7 switches over to shared power operation, this is transmitted to the central controller 17. On receiving data that shared power mode has been entered by one tile, the central controller 17 instructs all power supply units of other tiles via their controllers and power distribution boards to reduce brightness in the same proportion so that the image displayed by the wall remains uniform.

On the on-screen display OSD the faulty device is marked e.g. in a different colour, as shown in FIG. 2. As examples, a faulty first power supply 9, a faulty second power supply 10, a first faulty fan 11, a second faulty fan 12, a faulty tile controller 13, a faulty tile fan 13 and a faulty tile 15 are pictured.

The tile controller 7 monitors the devices attached to it and sends status and/or diagnostic information to a central unit 17 shown in FIG. 3. The central unit 7 converts the information received to a picture and displays the picture on the display wall, as an on-screen display or as a stand-alone picture. The picture may contain further information, such as fan speed or open circuits of the LEDs, which is displayed on the display wall.

The tiles and modules of the display wall as well as the further devices can be organised in a network with network addresses, e.g. in a daisy chain or ring. Individual devices, such as fans or power supplies, can be given a network address that is unique within the display wall arrangement.

Support personnel can use the invention to check the status of a display wall e.g. after installation, prior to usage or once a fault has occurred. The person can activate the on-screen display picture that is provided by the invention to receive information about the status and/or diagnostic state of the display wall. The information received helps the support personal to topographically detect the location of faulty devices.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured canned be used to advantage. Any reference signs in the claims should not be construed as limiting scope.

What is claimed is:

1. A display wall comprising:
   a plurality of M tiles,
   each tile comprising:
      a plurality of display modules,
      two power supply units, each power supply unit arranged to drive a number of display modules and to provide a maximum brightness, wherein said power supply units are not over-dimensioned for redundancy, and
      means that, during a failure of a first power supply unit of the two power supply units, links the output of the other power supply unit of the tile or the outputs of other power supply unit(s) of at least one other tile together with the first and failed power supply unit, such that the display module or modules driven by the first and failed power supply unit continue(s) to operate, by redistribution of power from the other power supply unit(s) so that, upon linking of the other power supply unit(s), a new maximum brightness of the display module or modules normally driven by the first power supply unit is (N−1)/N times a previous maximum brightness, wherein N is the number of linked power supply units,
   wherein the display wall further comprises:
      a central controller configured such that when an operation mode is entered such that the outputs of power supply units are linked together such that the module or modules driven by the first and failed power supply continue(s) to operate by redistribution of power from the other power supply units from the at least one other tile, the central controller instructs all power supply units of all remaining tiles of the display wall to reduce brightness in the same proportion so that the image displayed by the wall remains uniform.

2. The display wall according to claim 1, wherein each tile has a first and a second power supply unit, and a tile power distribution unit and a tile controller, the first power supply unit driving first modules and the second power supply unit driving second modules, such that, upon the failure of one of the first and second power supply units, the other of the first and second power supply unit is coupled to drive the first and second modules.

3. The display wall according to claim 1, wherein the display wall comprises an LED wall.

4. A method of driving a display wall having a plurality of tiles, each tile comprising a plurality of display modules, and two power supply units, each power supply unit arranged to drive a number of display modules and to provide a maximum brightness, wherein said power supply units are not over-dimensioned for redundancy, the method comprising the steps:
   during a failure of a first power supply unit of the plurality of two power supply units, linking the output of the other power supply unit of the tile or the outputs of other power supply unit(s) of at least one other tile together with the first and failed power supply unit, such that the display module or modules driven by the first and failed power supply unit continue(s) to operate, by redistribution of power from the other power supply unit(s),
   wherein upon said linking together, a new maximum brightness of the display module or modules normally driven by the first power supply unit is (N−1)/N times a previous maximum brightness, wherein N is the number of linked power supply units, and
   when an operation mode is entered such that the outputs of power supply units are linked together such that the module or modules driven by the first and failed power supply continue(s) to operate by redistribution of power from the other power supply units from the at least one other tile, all power supply units of all remaining tiles of the display wall reduce brightness in the same proportion so that the image displayed by the wall remains uniform.

5. The method according to claim 4, wherein each tile has a first and a second power supply unit, the method comprising:
   driving first modules and driving second modules so that when one of the first and second power supply units fail, the other of the first and second power supply unit is coupled to drive the first and second modules.

6. The method of claim 4, the display wall being controlled by a central unit, the method further comprising:
   collecting status and/or diagnostic information of the display wall inputted to the central unit;
   converting the status and/or diagnostic information to a picture; and
   displaying the picture on the display wall.

7. The method of claim 6, wherein the size of the picture corresponds to the size of the display wall.

8. The method of claim 6, wherein the picture is displayed as an on-screen display.

9. The method of claim 6, wherein the picture and the display wall are separated in at least one tile and wherein either or both the status and diagnostic information of each tile of the display wall is shown in its respective position in the picture.

10. The method of claim 9, wherein a tile comprises multiple modules and wherein either or both status and diagnostic information of each module of the display wall is shown in its respective position in the picture.

11. The method of claim 10, wherein each tile comprises a tile controller, wherein the tile controller collects either or both the status and diagnostic information of all modules of the respective tile and wherein the tile controller sends either or both status and diagnostic information to the central unit.

12. The method of claim 6, wherein at least one of the status and diagnostic information relate to devices of the display wall.

13. The method of claim 6, wherein the picture shows at least one device of the display wall and wherein each device of the display wall is shown in its respective position in the picture.

14. The method of claim 6, wherein the picture shows devices not visible from the front side of the display wall.

15. The method of claim 6, wherein at least one of the status and diagnostic information of a respective device is shown on the display wall in a different manner during a failure of the respective device.

16. The method of claim 6, wherein during a failure of a power supply the outputs of other power supplies are linked together such that at least one of the tile and module of the respective failed power supply continues to display the picture.

17. The method of claim 6, wherein the display wall is operated in either or both a normal mode and in a controlling mode.

18. A display wall comprising:
   a plurality of M tiles,
   each tile comprising:
      a plurality of display modules,
      two power supply units, each power supply unit arranged to drive a number of display modules and to provide a maximum brightness, wherein said power supply units are not over-dimensioned for redundancy, and
      means that, during a failure of a first power supply unit of the two power supply units, links the outputs of other power supply unit(s) of at least one other tile together with the first and failed power supply unit, such that the display module or modules driven by the first and failed power supply unit continue(s) to operate, by redistribution of power from the other power supply unit(s) so that, upon linking of the other power supply unit(s), a new maximum brightness of the display module or modules normally driven by the first power supply unit is (N−1)/N times a previous maximum brightness, wherein N is the number of linked power supply units,
   wherein the display wall further comprises:
   a central controller configured such that when an operation mode is entered such that the outputs of power supply units are linked together such that the module or modules driven by the first and failed power supply continue(s) to operate by redistribution of power from the other power supply units from the at least one other tile, the central controller instructs all power supply units of all remaining tiles of the display wall to reduce brightness in the same proportion so that the image displayed by the wall remains uniform.

* * * * *